UNITED STATES PATENT OFFICE.

ARTHUR ZART, OF VOHWINKEL, NEAR ELBERFELD, GERMANY, ASSIGNOR TO FARBEN-FABRIKEN VORM. FRIEDR. BAYER & CO., OF ELBERFELD, GERMANY, A CORPORATION OF GERMANY.

AZO COLORING-MATTER.

1,022,288.     Specification of Letters Patent.     Patented Apr. 2, 1912.

No Drawing. Application filed June 6, 1911, Serial No. 631,552. Renewed February 7, 1912. Serial No. 676,014.

*To all whom it may concern:*

Be it known that I, ARTHUR ZART, doctor of philosophy, chemist, citizen of the German Empire, residing at Vohwinkel, near Elberfeld, Germany, have invented new and useful Improvements in Azo Coloring-Matter, of which the following is a specification.

My invention relates to the manufacture and production of new coloring matters having most probably the formula:

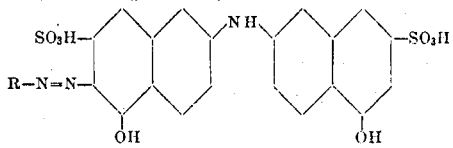

R meaning an arylcarbonyl-2-amino-5-naphthol-7-sulfonic acid, such as benzoyl- or para-anisoyl-2-amino-5-naphthol-7-sulfonic acid, etc. The new dyes are obtained by combining one molecule of diazotized 2-aminoarylcarbonylamino-5-naphthol-7-sulfonic acid with the 5.5′-dioxy-2.2′-dinaphthylamin-7.7′-disulfonic acid.

The new dyes are after being dried and pulverized in the shape of their alkaline salt dark powders easily soluble in water. They yield upon reduction with stannous chlorid and hydrochloric acid an amino-arylcarbonyl-2-amino-5-naphthol-7-sulfonic acid and 5.5′-dioxy-6-amino-2.2′-dinaphthylamin-7.7′-disulfonic acid. They dye cotton blue-red shades which can be combined on fiber with diazotized para-nitranilin; from red to Bordeaux shades being thus obtained which are fast to washing and can be discharged to a pure white.

In order to illustrate the new process more fully the following example is given, the parts being by weight:—358 parts of 2-para-aminobenzoylamino-5-naphthol-7-sulfonic acid are diazotized with 69 parts or sodium nitrite and hydrochloric acid and the resulting diazo compound is combined with a solution of 461 parts of 5.5′-dioxy-2.2′ dinaphthylamin-7.7′-disulfonic acid:

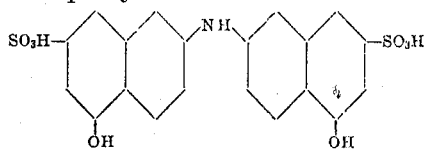

containing an excess of sodium bicarbonate. When the combination is complete the disazo dye is salted out. It is after being dried and pulverized in the shape of its sodium salt a dark powder, soluble in water with a bluish-red color and soluble in concentrated sulfonic acid with a bluish-red color. By reduction with stannous chlorid and hydrochloric acid the dye is decomposed. 2-para-aminobenzoylamino-5-naphthol-7-sulfonic acid and the 5.5′-dioxy-6-amino-2.2′-dinaphthylamin-7.7′-disulfonic acid are obtained. It dyes cotton bluish-red shades, changing into a fast Bordeaux by development with diazotized para-nitranilin. The shade thus obtained is fast to washing and can be discharged to a pure white with hydrosulfite.

The monoazo dye obtained from 2-meta-aminobenzoylamino-5-naphthol-7-sulfonic acid dyes cotton red yielding a bluish-red by developing the dyed fiber with diazotized para-nitranilin. On using meta-amino-para-anisoyl-2-amino-5-naphthol-7-sulfonic acid somewhat more bluish shades are obtained.

I claim:—

1. The herein described new monoazo dyestuffs having most probably the formula:

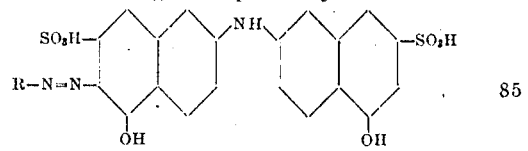

R meaning 2-arylcarbonylamino-5-naphthol-7-sulfonic acid, which are after being dried and pulverized in the shape of their alkaline salts dark powders easily soluble in water; yielding upon reduction with stannous chlorid and hydrochloric acid an aminoarylcarbonyl-2-amino-5-naphthol-7-sulfonic acid and 5.5′-dioxy-6-amino-2.2′-dinaphthylamin-7.7′-disulfonic acid; dyeing cotton blue-red shades which can be combined on fiber with diazotized para-nitranilin to red to Bordeaux shades which are fast to washing and can be discharged to a pure white, substantially as described.

2. The herein described new monoazo dyestuff having most probably the formula:

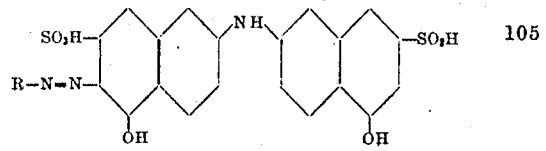

R meaning 2-benzoylamino-5-naphthol-7- sulfonic acid, which is after being dried and pulverized in the shape of its sodium salt a dark powder, soluble in water with a bluish-red color and soluble in concentrated sulfuric acid with a bluish-red color; yielding upon reduction with stannous chlorid and hydrochloric acid 2-para-amino-benzoylamino-5-naphthol-7-sulfonic acid and 5.5'-dioxy-6-amino-2.2'-dinaphthylamin-7.7'-disulfonic acid; dyeing cotton bluish-red shades, changing into a fast Bordeaux by development with diazotized para-nitranilin which are fast to washing and can be discharged to a pure white with hydrosulfite, substantially as described.

In testimony whereof I have hereunto set my hand in the presence of two subscribing witnesses.

ARTHUR ZART. [L. S.]

Witnesses:
 ALFRED HENKEL,
 ALBERT F. NEEFER.